(12) United States Patent
Neurohr et al.

(10) Patent No.: US 8,630,365 B2
(45) Date of Patent: Jan. 14, 2014

(54) TRANSCEIVER FOR COMMUNICATING OVER DIFFERENT MEDIA TYPES

(75) Inventors: Norbert Neurohr, Unterhaching (DE); Axel Clausen, Muenchen (DE); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 1191 days.

(21) Appl. No.: 12/325,667

(22) Filed: Dec. 1, 2008

(65) Prior Publication Data

US 2009/0190635 A1 Jul. 30, 2009

Related U.S. Application Data

(60) Provisional application No. 61/024,343, filed on Jan. 29, 2008.

(51) Int. Cl.
*H04L 27/00* (2006.01)

(52) U.S. Cl.
USPC ............ 375/295; 375/316; 375/216; 370/401

(58) Field of Classification Search
USPC .................. 375/295, 316, 216; 370/401
See application file for complete search history.

(56) References Cited

U.S. PATENT DOCUMENTS

| | | | |
|---|---|---|---|
| 6,628,735 B1 * | 9/2003 | Belotserkovsky et al. | ... 375/355 |
| 2002/0075830 A1 * | 6/2002 | Hartman, Jr. | .............. 370/333 |
| 2006/0126490 A1 * | 6/2006 | Hagen et al. | ............. 370/208 |
| 2007/0030116 A1 | 2/2007 | Feher | |
| 2008/0205417 A1 * | 8/2008 | Li | ................................ 370/401 |
| 2012/0092205 A1 * | 4/2012 | Bourdelais et al. | ............ 342/21 |

* cited by examiner

*Primary Examiner* — Zewdu Kassa

(74) *Attorney, Agent, or Firm* — Eschweiler & Associates, LLC

(57) ABSTRACT

One embodiment of the present invention relates to a transceiver. The transceiver includes a transmitter having a first transmission path configured to transmit a digital baseband signal over a wireline medium. In addition, the transmitter has a second transmission path configured to transmit a radio frequency signal over a wireless medium. Other systems and methods are also disclosed.

15 Claims, 4 Drawing Sheets

TRANSCEIVER FOR COMMUNICATING OVER DIFFERENT MEDIA TYPES

RELATED APPLICATION

This application claims priority to U.S. Provisional Application Ser. No. 61/024,343 filed on Jan. 29, 2008, entitled "Transceiver For Communicating Over Different Media Types."

FIELD OF DISCLOSURE

The present invention relates to generally to communication networks and more particularly to adaptive communication networks.

BACKGROUND

In recent years, continuously growing attention has been paid to wireless local area networks (LANS) and home networking systems. Depending on the implementation, these networks can utilize several different types of transmission media, including but not limited to: wireless, coax cable, twisted pair, and power-line media.

Although these systems can utilize several different types of media, unfortunately, different transceivers are needed for communication over each different type of media. For example, one transceiver is needed for wireless communication and a second, separate transceiver is needed for wireline communication. Consequently, providing a solution that can communicate over several different types of media is very expensive in terms of silicon area and cost. Thus, there is a long-felt but unresolved need for a single transceiver solution that can communicate over different types of media.

SUMMARY

One embodiment of the present invention relates to a transceiver. The transceiver includes a transmitter having a first transmission path configured to transmit a digital baseband signal over a wireline medium. In addition, the transmitter has a second transmission path configured to transmit a radio frequency signal over a wireless medium. Other systems and methods are also disclosed.

FIGURES

DETAILED DESCRIPTION

Figure 1:
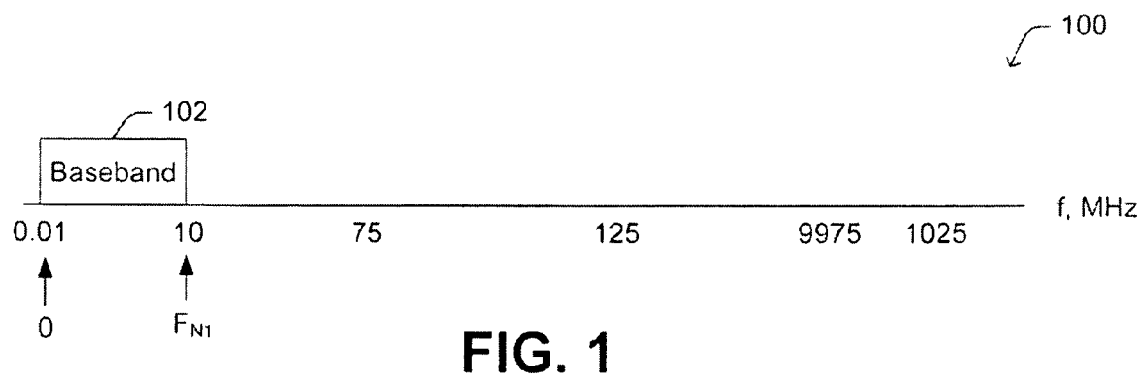
FIG. 1 shows one embodiment of a baseband signal.

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

The inventors have fashioned advantageous baseband/passband transmission techniques, which can be used for wireless and wireline communication. In addition, the inventors have fashioned advantageous transmitters that can transmit over wireline and wireless media by flexibly changing among baseband, wireline passband, and wireless passband transmission. To facilitate this functionality, the multicarrier modulation technique OFDM based on the discrete Fourier transform (DFT) is used in some embodiments.

FIG. 1 shows a frequency spectrum 100 supported by a first transmission medium over which baseband communication can be established. For baseband transmission, a baseband signal is generated in a baseband frequency band 102 with a range of frequencies from zero to the Nyquist frequency, $F_{N1}$, where the Nyquist frequency is half of the sampling rate of the discrete signal processing system. Thus, in some instances, the baseband signal can include a range of several frequencies within the baseband frequency band 102 added together. In this example, the baseband frequency band 102 ranges from about 0 MHz to about 10 MHz.

Figure 2:
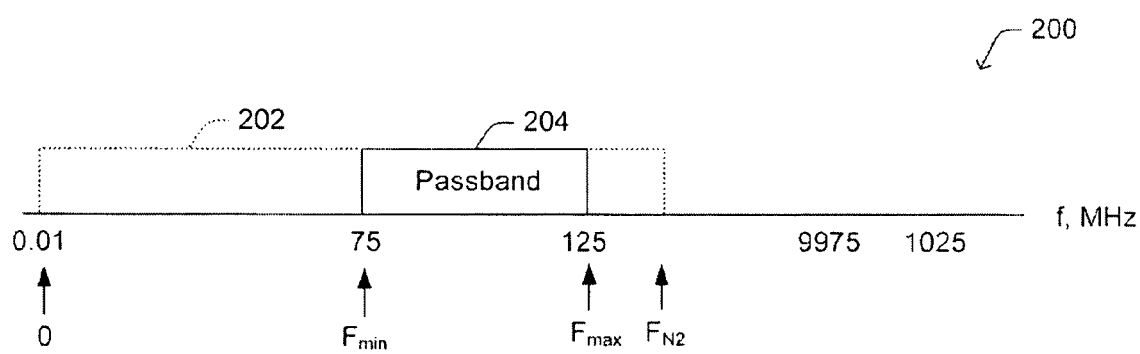
FIG. 2 shows one embodiment of a pass-band signal in relation to a baseband signal.

Because few transmission media will pass low frequencies without distortion, many transmitters will "copy" the baseband signal up to higher frequencies for transmission. Therefore, FIG. 2 shows an embodiment of another frequency spectrum 200 supported by a second transmission medium. In this example, the transmission medium isn't suitable for transmitting low frequency signals near the bottom of the baseband frequency band 202. Thus, the transmitter turns off some sub-carriers to establish a passband 204 between a non-zero frequency, $F_{min}$, and an upper frequency $F_{max}$, which may be the same or different than a Nyquist frequency, $F_{N2}$. In some embodiments, passband transmission can be thought of as when the transmitter can operate using only digital processing over lower frequencies. For example, in some embodiments the passband 204 has a frequency of about 2.00-300 MHz, while in the illustrated embodiment the passband 204 ranges from about 75-125 MHz.

Figure 3:
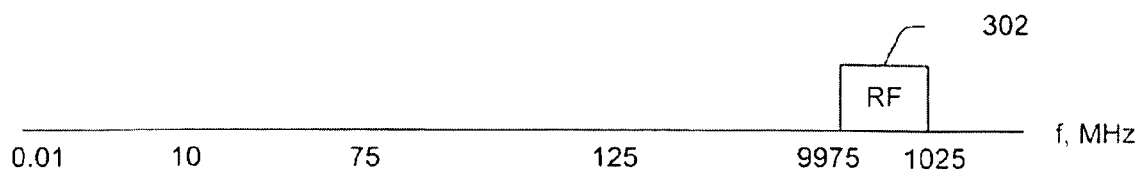
FIG. 3 shows one embodiment of a radio frequency (RF) pass band signal.

FIG. 3 shows an example of another frequency spectrum supported by a wireless transmission medium. In this example, the transmitter "boosts" the baseband signal to a radio-frequency (RF) passband 302, which allows efficient power transfer over the wireless medium. In this example, the RF passband 302 has a frequency ranging from about 9975 to about 1025 MHz, but could also have a range of several GHz in other embodiments.

Because some networks, such as home networks, include several different types of media, it would be advantageous if a single transmitter could transmit over frequency bands respectively associated with the different types of media (e.g., baseband 102, passband 204, RF passband 302). This would allow copies of a single transmitter to be re-used at different nodes throughout the network. However, because different frequencies are required for each frequency band, providing a solution that can communicate over each of these media types has been very expensive in terms of silicon area and cost until now.

Figure 4:
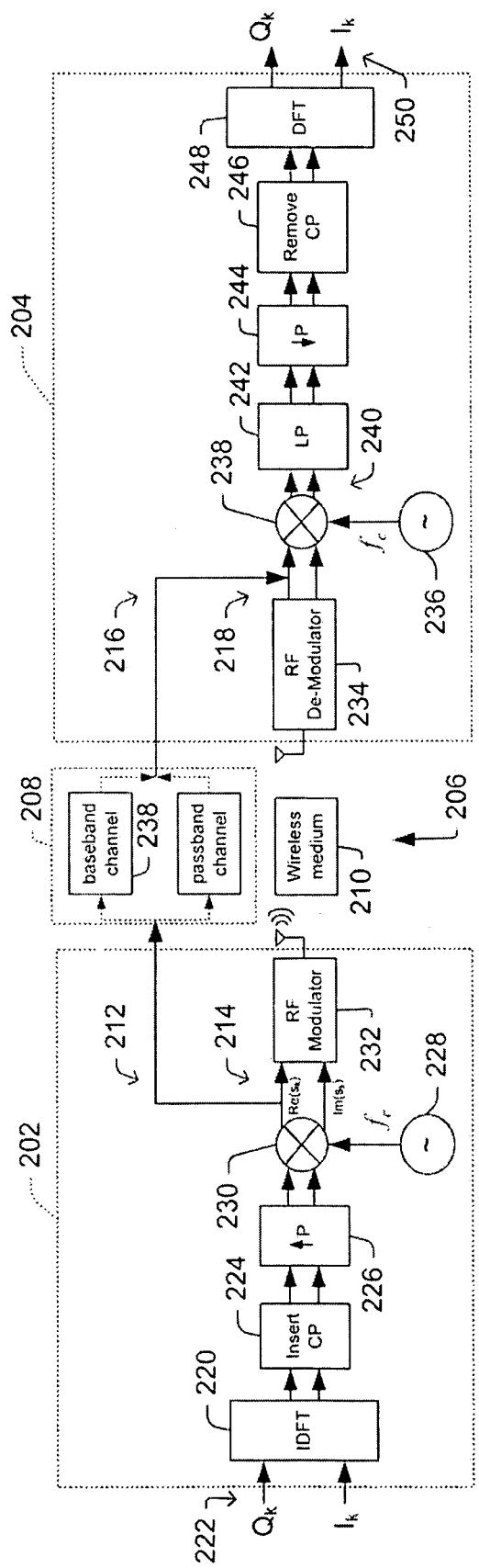
FIG. 4 shows one embodiment of a multicarrier transceiver that can communicate over baseband and passband frequencies.

One embodiment of the invention is depicted in FIG. 4. In FIG. 4, a transmitter 202 communicates with a receiver 204 over a one of several transmission mediums 206. More specifically, the transmitter 202 and receiver 204 can be re-configured to communicate over wireline medium(s) 208 and/or wireless medium(s) 210.

The transmitter 202 includes a first transmission path 212 for selectively transmitting baseband and/or passband signals over the wireline medium(s) 208, which can support baseband and/or passband transmission. The transmitter 202 also includes a second transmission path 214 for transmitting radio frequency (RF) passband signals via an antenna over the wireless medium 210. On the receive side, the receiver 204 includes a first reception path 216 for receiving the baseband and/or passband signals and a second reception path 218 for receiving the RF passband signal.

If OFDM is used during transmitter operation, an inverse Fourier transform (IDFT) block 220 receives N symbol vector elements 222 ($x_k = I_k + jQ_k$) and generates a complex baseband time-domain signal corresponding to one OFDM symbol therefrom. A cyclic prefix block 224 inserts a cyclic prefix, after which an interpolation filter 226 with factor p filters the signal. In some embodiments windowing is introduced at the border of the OFDM symbols in time domain and/or subsequent OFDM symbols overlap in time domain. To determine whether a baseband or passband signal is transmitted on the first transmission path 212, the transmitter 202 includes an adjustable and free running frequency source 228 that provides a frequency $f_c$. For baseband transmission, $f_c$ is set to a low frequency corresponding to at least half the signal bandwidth, but for passband transmission $f_c$ is set to a higher frequency at the center of the passband (e.g., $f_c$ is about 45 MHz). The digital mixer 230 receives the frequency $f_c$, and provides a mixed signal $s_k$ as a function thereof. The mixed signal $s_k$ has a real component $Re(s_k)$ and an imaginary component $Im(s_k)$, and can thus be expressed in the format $e^{j2\pi f_c t}$. For baseband or passband communication, the real component is transmitted over the wireline medium 208, while the imaginary component is discarded. For wireless transmission, an RF modulator 232 upshifts the real and imaginary components of mixed signal $s_k$ to an RF signal, which is then transmitted on the second transmission path 214.

During receiver operation, an RF demodulator 234 on the second reception path 218 down-shifts the RF signal received from the wireless medium 210 to a down-shifted RF signal. A second adjustable and free running frequency source 236, which has a frequency corresponding to that of the first adjustable frequency source 228, provides a frequency to a digital mixer 238 ($e^{j2\pi f_c t}$). The digital mixer 238 processes the down-shifted RF signal and/or a signal received from the first reception path 216, thereby generating a mixed signal at 240. A low-pass filter 224 filters the mixed signal 240, after which a decimator 244 with factor p reduces the number of samples. Block 246 removes the cyclic prefix, and then the DFT block 248 uses N-point DFT to demodulate the final signal 250, ideally recreating the transmitted N symbol vector elements ($x_k = I_k + jQ_k$).

In one baseband transmission embodiment, the IDFT block 220 uses a single size IDFT, which means the number of sampling points in the IDFT equals the number of subcarriers in a multi-carrier signal transmitted over the baseband channel 252. The interpolator 226 then interpolates by a factor of 2. The digital mixer 232 is set to receive a low center frequency, $f_c$, corresponding to at least half the signal bandwidth, thereby generating a real baseband signal $\{Re(s_k)\}$, where the starting frequency ($F_{min}$) of the output multi-carrier signal is zero or close to 0 (e.g., $f_c = F_N/2$, where $F_N$ is the Nyquist frequency, which is the upper frequency of the baseband signal). The real part (Re) of the baseband signal is transmitted onto the first transmission path 212 and over the wireline medium 208. At the receiver 204, the baseband signal is received over the first reception path 216 and down-shifted by the digital mixer 238 and then filtered at 242 before being processed by the DFT block 248. In this embodiment, the baseband waveforms look as follows:

$$f_c = \frac{\frac{N}{2}}{Np} = \frac{1}{2p}; p = 2; k + \frac{N}{2} \to k \quad (1)$$

$$u_k^{(I)}(m) = \frac{1}{\sqrt{N}} \cos\left(2\pi\left(\frac{k}{2N}\right)m\right); \quad (2)$$

$$k = 0, \ldots, N-1; m = -2L, \ldots, 2N-1$$

$$u_k^{(Q)}(m) = -\frac{1}{\sqrt{N}} \sin\left(2\pi\left(\frac{k}{2N}\right)m\right); \quad (3)$$

$$k = 0, \ldots N-1; m = -2L, \ldots, 2N-1$$

where L=the length of the cyclic pre-fix, N=the number of subcarriers; and p is the oversampling factor of the interpolator. These waveforms are modulated by the symbol vector elements $x_k$, resulting in the following baseband signal:

$$s(m) = \sum_{k=0}^{N-1} \left(x_k^{(I)} u_k^{(I)}(m) + x_k^{(Q)} u_k^{(Q)}(m)\right) \quad (4)$$

$$= \frac{1}{\sqrt{N}} \sum_{k=0}^{N-1} \left(x_k^{(I)} \cos\left(2\pi\left(\frac{k}{2N}\right)m\right) - x_k^{(Q)} \sin\left(2\pi\left(\frac{k}{2N}\right)m\right)\right) \quad (5)$$

where $x_k$ is the complex symbol vector element to be transmitted on the respective kth subcarrier.

In one passband transmission embodiment over the wireline medium 208, the IDFT block 214 again uses a single size IDFT, but in this instance the digital mixer 222 shifts the signal generated by IDFT 214 to a passband frequency (instead of baseband). For example, in one embodiment, the center frequency $f_c$ of the digital mixer 222 is set to about 45 MHz, causing the digital mixer 222 to output a signal with a frequency between about 30 MHz and about 60 MHz. As above, the real part (Re) of the passband signal is then fed to the wireline media 208 via the analog front-end. At the receiver 204, the passband signal is received on the first reception path at mixer 228 and filtered at 230, before being processed by the DFT block 236.

Figure 5:
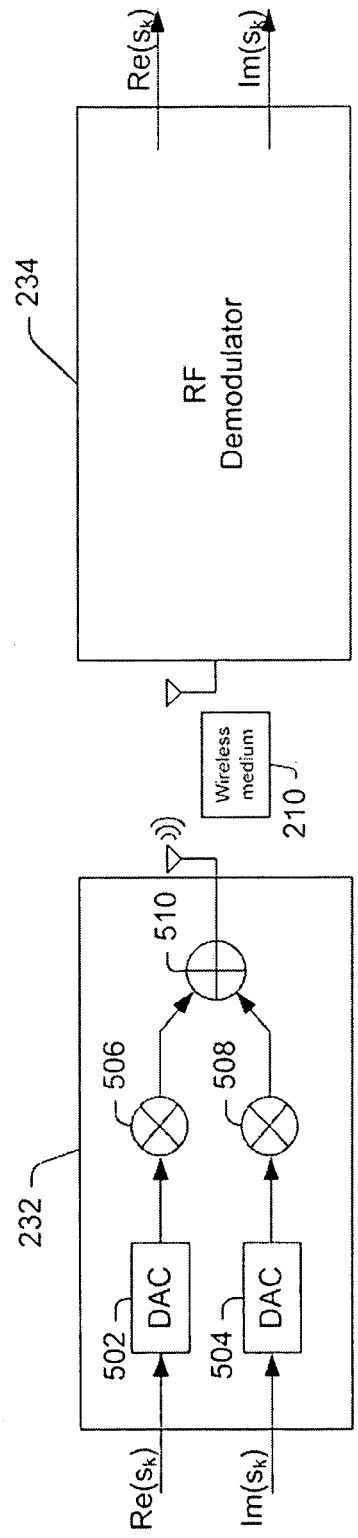
FIG. 5 shows an embodiment of an RF modulator and RF demodulator.

For RF passband transmission (e.g., operating in the frequency range 0.5-10 GHz), typical digital implementations are incapable to up-shift up to these high frequencies. Consequently, as shown in FIG. 5, one embodiment of an RF modulator 232 includes first and second digital-to-analog converters (DACS) 502, 504 for receiving the real and imaginary components of the up-shifted signal, respectively. The RF modulator 232 also includes first and second analog mixers 506, 508 that upshift the real and imaginary upshifted signals, respectively, to the RF frequency range; as well as an adder 510 for combining the real and imaginary signals for transmission onto the transmission medium 210. In RF transmission, the digital mixer 222 may be used for small adjustments of the center frequency $f_c$, or may not be used at all if high granularity of center frequency settings could be provided by the RF modulator 224. After the transmitter 202 transmits the outgoing RF signal, the signal travels over the wireless medium 210, before being demodulated in the receiver 204 as shown in FIGS. 4, 5.

Figure 6:
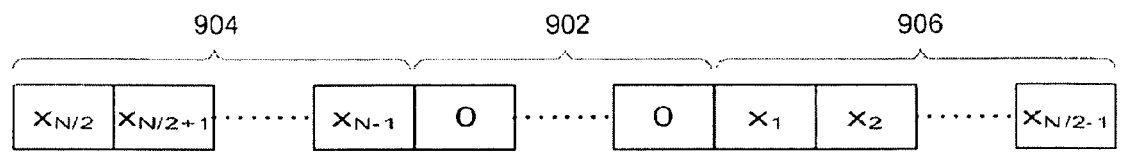
FIG. 6 shows an arrangement for 2N input signals onto an Inverse Discrete Fast Fourier Transform (IDFT) circuit.

In one embodiment, the transmitter 202 can provide a baseband signal that is compatible with a standard discrete multi-tone (DMT) signal. This could be accomplished, for example, when the IDFT block 214 performs a 2N-point IDFT, where N data inputs are symbol vector elements $x_k = I_k + jQ_k$ and N input signals are zeros, such as shown in FIG. 6. In FIG. 6, N+1 zeros 902 are put between a first string of symbol vector elements 904 and a second string of symbol vector elements 906. Thus, for example, if there are N=10 subcarriers, the first string of symbol vector elements 904 (x5, x6, x7, x8, x9); followed by 11 zeros; followed by the second string of vector symbols (x1, x2, x3, x4). After being up-shifted by N/2, the baseband transmission signal looks as follows:

$$s(m) = \mathrm{Re}\left(IDFT_{2N}(x) \cdot \exp\left(j\frac{1}{2}\pi m\right)\right) \quad (6)$$

$$= \frac{1}{\sqrt{2N}} \sum_{k=0}^{N/2-1} \left(x_{k+N/2}^{(I)} \cos\left(j2\pi \frac{k+N/2}{2N} m\right) - x_{k+N/2}^{(Q)} \sin\left(j2\pi \frac{k+N/2}{2N} m\right)\right) + \quad (7)$$

$$\frac{1}{\sqrt{2N}} \sum_{k=0}^{N/2-1} \left(x_{k-3N/2}^{(I)} \cos\left(j2\pi \frac{k+N/2}{2N} m\right) - x_{k-3N/2}^{(Q)} \sin\left(j2\pi \frac{k+N/2}{2N} m\right)\right)$$

$$= \frac{1}{\sqrt{2N}} \sum_{k=N/2}^{N-1} \left(x_k^{(I)} \cos\left(j2\pi \frac{k}{2N} m\right) - x_k^{(Q)} \sin\left(j2\pi \frac{k}{2N} m\right)\right) + \quad (8)$$

$$\frac{1}{\sqrt{2N}} \sum_{k=1}^{N/2-1} \left(x_k^{(I)} \cos\left(j2\pi \frac{k+2N}{2N} m\right) - x_k^{(Q)} \sin\left(j2\pi \frac{k+2N}{2N} m\right)\right) \quad (9)$$

$$= \frac{1}{\sqrt{2N}} \sum_{k=0}^{N-1} \left(x_k^{(I)} \cos\left(j2\pi \frac{k}{2N} m\right) - x_k^{(Q)} \sin\left(j2\pi \frac{k}{2N} m\right)\right)$$

As one of ordinary skill in the art will appreciate, the baseband transmission signal differs by a gain factor of 2 from conventional DMT, so the proposed transceiver is backwards compatible with existing DMT transceivers.

Figure 7:
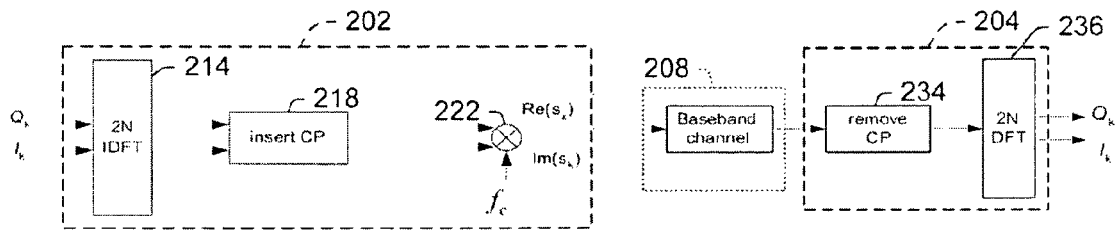
FIG. 7 shows an embodiment of a multi-carrier demodulator working with a DMT demodulator.

FIG. 7 shows a block diagram 700 of the transmission path using this backwards compatible DMT technique. For purposes of simplicity, some of the previously discussed elements have been omitted (e.g., RF modulator 224), but it will be appreciated that in some embodiments these previously discussed features could also be included.

Another embodiment concerns operation of the Multi-carrier demodulator when it demodulates a DMT signal. An example where a receiver demodulates a DMT signal is presented in FIG. 8.

Figure 8:
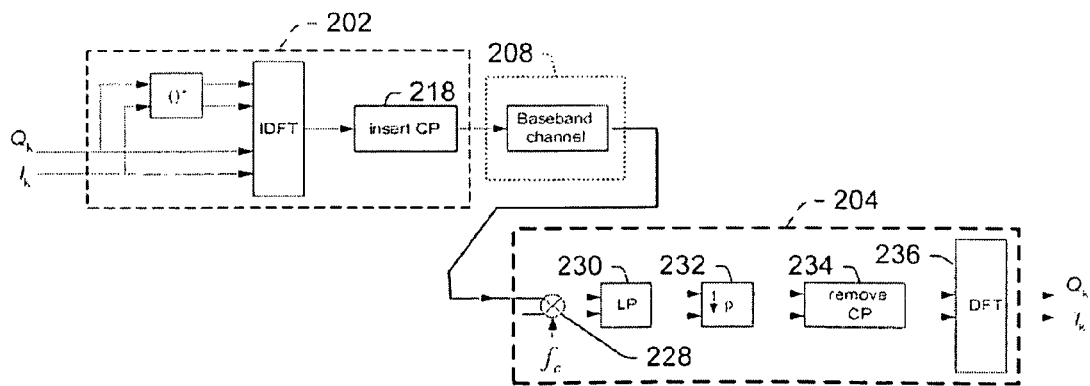
FIG. 8 shows an embodiment of a multi-carrier demodulator operating with a DMT modulator and a multi-carrier demodulator with N-point DFT and p=2.

FIG. 8's receiver 204 shows an implementation using N-point DFT 248 and a decimator 244 with a factor of 2 (p=2). Another solution will be to use 2N-point DFT with no decimation. In this case, as it was explained above, all N+1 received $x_k$ symbol vector elements between $x_{N/2}$ and $x_{N+N/2+1}$ are ignored and the rest of the received values should be interpreted according to FIG. 8.

Figure 9:
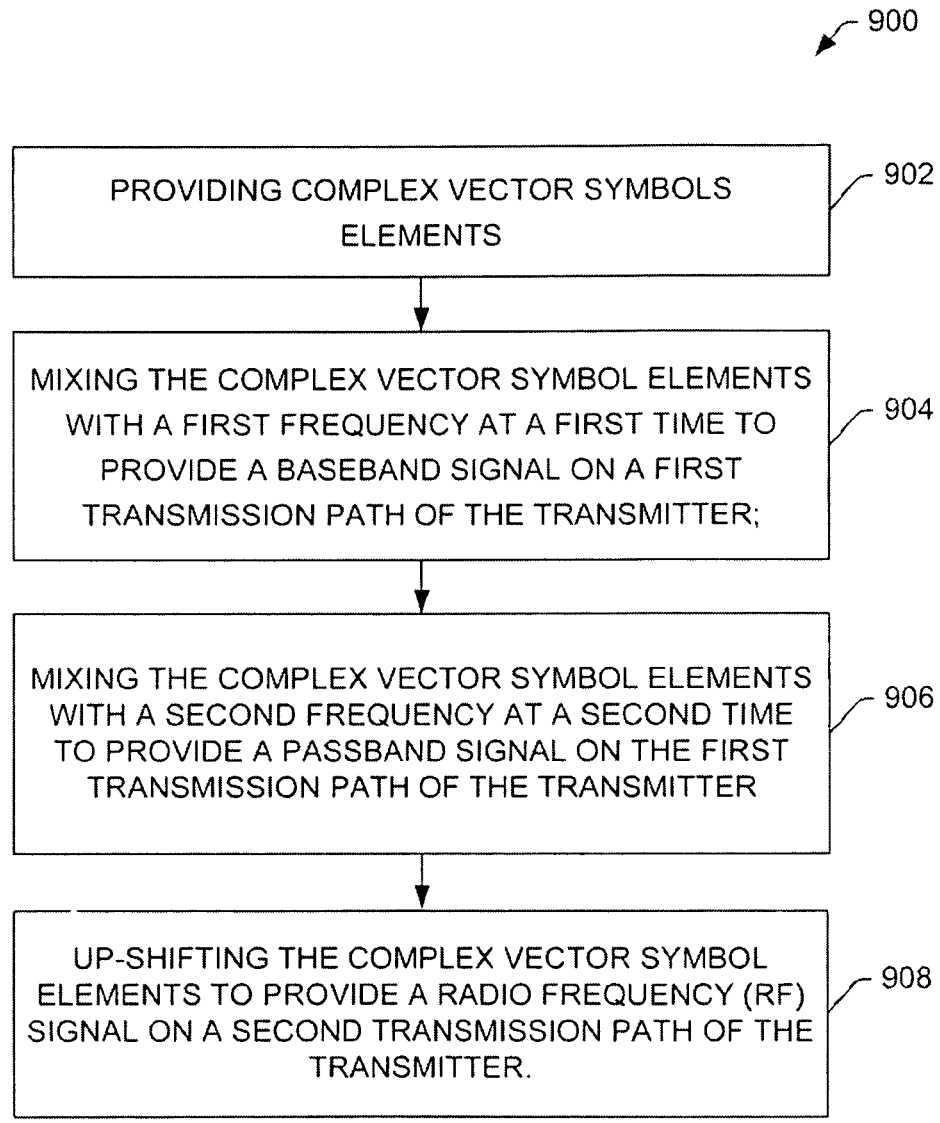
FIG. 9 shows a flowchart in accordance with one embodiment.

Now that some structural and functional features have been described, a method 900 is set forth with respect to FIG. 9. While the method 900 illustrated below is illustrated and described as a series of acts or events, it will be appreciated that the present invention is not limited by the illustrated ordering of such acts, or events. For example, some acts may occur in different orders and/or concurrently with other acts or events apart from those illustrated and/or described herein, in accordance with the invention. In addition, not all illustrated acts may be required to implement a methodology in accordance with the present invention.

FIG. 9's method 900 starts at 902, where complex vector symbol elements are provided. Often these are provided in I-Q data format.

At 904, the complex vector symbol elements are mixed with a first frequency at a first time to provide a baseband signal on a first transmission path of the transmitter.

At 906, the complex vector symbol elements are mixed with a second frequency at a second time to provide a passband signal on the first transmission path of the transmitter.

At 908, the complex vector symbol elements are up shifted to provide a radio frequency (RF) signal on a second transmission path of the transmitter.

While examples of the invention have been illustrated and described with respect to one or more implementations, alterations and/or modifications may be made to the these examples without departing from the spirit and scope of the appended claims. For example, although the term "number" may be used, it will be construed broadly to include any positive integer inclusively ranging from one to practically infinity. In regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A transmitter, comprising:
    a first transmission path adapted to selectively transmit a baseband signal over a baseband frequency band or a passband signal over a passband frequency band supported by a wireline medium;
    a second transmission path adapted to transmit a radio frequency (RF) signal over a wireless medium;
    an adjustable frequency source adapted to selectively generate a signal having a frequency in the baseband frequency band or the passband frequency band, wherein the baseband frequency band and the passband frequency band are different from one another;

a mixer adapted to selectively provide the baseband signal and the passband signal over the first transmission path as a function of the frequency; and a radio frequency (RF) modulator downstream of the mixer, and adapted to up-convert the baseband signal or the passband signal to the RF signal.

2. The transmitter of claim 1, where the mixer is adapted to receive a first frequency to generate the baseband signal and a second frequency to generate the passband signal, the first frequency being greater than the second frequency.

3. The transmitter of claim 1, where the RF modulator comprises:

first and second digital-to-analog converters adapted to receive real and imaginary components, respectively, of the baseband or passband signal and provide respective analog signals as a function thereof;

first and second mixers adapted to up shift the respective analog signals to RF signals; and an adder adapted to combine the RF signals.

4. The transmitter of claim 1, further comprising:

an inverse discrete Fourier transform (IDFT) block adapted to receive a number (N) of input signals and provide a sampled signal as a function of the input signals; and an interpolator adapted to provide an interpolated signal as a function of the sampled signal; and another mixer adapted to receive the interpolated signal and provide the baseband or passband signal as a function thereof.

5. The transmitter of claim 4, where the transmitter is adapted to transmit a real portion of the baseband or passband signal while discarding an imaginary portion of the baseband or passband signal.

6. The transmitter of claim 4, where the IDFT block receives 2N input signals, where N+1 input signals are zeros and N−1 input signals are symbol vector elements.

7. The transmitter of claim 1, further comprising:

a RF modulator adapted to up-convert the baseband signal or the passband signal to the RF signal.

8. The transmitter of claim 7, where the RF modulator comprises:

first and second digital-to-analog converters adapted to receive real and imaginary components, respectively, of the baseband or passband signal and provide respective analog signals as a function thereof;

first and second mixers adapted to up shift the respective analog signals to RF signals; and an adder adapted to combine the RF signals.

9. The transmitter of claim 1, where the transmitter is configured to communicate using both orthogonal-frequency-division multiplexing (OFDM) and discrete multitone (DMT) communication.

10. The transmitter of claim 4, wherein the IDFT block is adapted to receive a number (2*N) of input signals, where N corresponds to the number of carriers over which data is to be transmitted; and where approximately N input signals are complex symbol vector elements and where approximately N input signals are zeros.

11. The transmitter of claim 10, where the N input signals that are zeros are on successive inputs.

12. The transmitter of claim 10, where approximately half of the N complex symbol vector elements are loaded on lowermost carriers and approximately half of the N complex symbol vector elements are located on uppermost carriers, and where the zeros are arranged between the uppermost carriers and lowermost carriers.

13. The transmitter of claim 10, where the transmitter is adapted to transmit a signal, s(m), according to the following relation:

$$s(m) = \frac{1}{\sqrt{2N}} \sum_{k=0}^{N-1} \left( x_k^{(I)} \cos\left(j2\pi \frac{k}{2N} m\right) - x_k^{(Q)} \sin\left(j2\pi \frac{k}{2N} m\right) \right).$$

14. A method of modulating a signal in a transmitter, comprising:

providing complex vector symbols elements;

mixing, at a mixing component, the complex vector symbol elements with a first frequency signal in a baseband frequency band at a first time to provide a baseband signal on a first transmission path of the transmitter;

mixing, at the mixing component, the complex vector symbol elements with a second frequency signal in a passband frequency band at a second time to provide a passband signal on the first transmission path of the transmitter, wherein the first time and the second time are different, and wherein the baseband frequency band the passband frequency band are different; and up-shifting the complex vector symbol elements to provide a radio frequency (RF) signal on a second transmission path of the transmitter.

15. The method of claim 14, where the complex vector symbol elements are provided in I-Q format.

* * * * *

UNITED STATES PATENT AND TRADEMARK OFFICE
CERTIFICATE OF CORRECTION

PATENT NO. : 8,630,365 B2  Page 1 of 1
APPLICATION NO. : 12/325667
DATED : January 14, 2014
INVENTOR(S) : Axel Clausen et al.

It is certified that error appears in the above-identified patent and that said Letters Patent is hereby corrected as shown below:

In the Claims

Column 8, Claim 9, Line 3 Please replace "mufti-tone" with --multi-tone--

Signed and Sealed this
Eighth Day of April, 2014

Michelle K. Lee
*Deputy Director of the United States Patent and Trademark Office*